United States Patent [19]

Willeitner

[11] 4,292,058

[45] Sep. 29, 1981

[54] SWIRL TUBE APPARATUS FOR SEPARATING GAS OR ISOTOPE MIXTURES

[75] Inventor: Eberhard Willeitner, Utting a. Ammersee, Fed. Rep. of Germany

[73] Assignee: Maschinenfabrik Augsburg-Nürnberg AG, Fed. Rep. of Germany

[21] Appl. No.: 946,219

[22] Filed: Sep. 27, 1978

[30] Foreign Application Priority Data

Sep. 30, 1977 [DE] Fed. Rep. of Germany ....... 2743995

[51] Int. Cl.³ ...................... B01D 45/12; B01D 59/20
[52] U.S. Cl. ........................................ 55/348; 55/349; 55/396; 55/403; 55/406; 55/405; 55/DIG. 14; 233/DIG. 1
[58] Field of Search ................... 55/17, 207, 346, 348, 55/349, 396, 400, 401, 403, 406, 407–409, DIG. 14, 392, 404, 405; 233/DIG. 1

[56] References Cited

U.S. PATENT DOCUMENTS

| | | | |
|---|---|---|---|
| 1,700,928 | 2/1929 | Fawkes | 55/17 |
| 2,219,377 | 10/1940 | Anderson | 55/346 |
| 2,385,745 | 9/1945 | Vogt | 55/392 |
| 2,896,744 | 7/1959 | Chapman | 55/392 |
| 3,535,850 | 10/1970 | Von Ohain et al. | 55/348 |
| 3,626,664 | 12/1971 | Hoffstrom | 55/17 |
| 3,633,344 | 1/1972 | Blank et al. | 55/349 |

FOREIGN PATENT DOCUMENTS

| | | | |
|---|---|---|---|
| 170856 | 9/1951 | Austria | 55/349 |
| 219061 | 6/1961 | Austria | 55/400 |
| 436066 | 11/1923 | Fed. Rep. of Germany | 55/409 |
| 197712 | 12/1977 | Netherlands | 233/DIG. 1 |
| 7809436 | 3/1979 | Netherlands | 55/404 |
| 760669 | 11/1956 | United Kingdom | 55/348 |

*Primary Examiner*—David L. Lacey
*Attorney, Agent, or Firm*—Craig and Antonelli

[57] ABSTRACT

Swirl tube apparatus is provided for separating isotope or gas mixtures containing heavy and light gas fractions. A plurality of swirl chambers are provided which are disposed in facing aligned relationship with respect to adjacent chambers. The respective adjacent swirl chambers have at least one common extraction port for extracting one or the other of the gas fractions. In certain preferred embodiments, the swirl chambers are contained in static tubes, while other preferred embodiments includes rotatable gas bearing supported swirl tubes.

5 Claims, 9 Drawing Figures

SWIRL TUBE APPARATUS FOR SEPARATING GAS OR ISOTOPE MIXTURES

BACKGROUND AND SUMMARY OF THE INVENTION

This invention relates to swirl tube apparatus for separating gas or isotope mixtures having at least one inlet port through which the gas enters tangentially into a chamber enclosed by a swirl tube.

In the swirl tube process of separation a gas jet is introduced tangentially into a stationary or rotating tube. Rotation of the gas causes the heavy particles to be separated from the lighter particles as a result of the centrifugal pressure field aided by the potential swirl effect.

A swirl tube arrangement of this type has been contemplated which at its major-diameter end is closed off by a wall. At this end, inlet ports directed tangentially to the end wall of the swirl tube are provided for introducing the gas mixture. Owing to the circular cross section of the chamber the gas is caused to rotate and is carried helically towards the minor-diameter end of the chamber. At this end the heavy gas fraction is extracted, while the lighter gas fraction rotating in predominantly inner areas flows back axially and is exhausted by an extraction pipe carried through the end wall of the swirl chamber.

This previously contemplated swirl tube apparatus provides a disadvantage, however, in that it exhibits relatively high friction losses making for poor separating output despite the higher gas velocities.

In a broad aspect the present invention provides a swirl tube arrangement of the noted type which is easy to manufacture and which gives a maximum of efficiency.

It is a particular object of preferred embodiments of the present invention to provide arrangements where the gas is fed in the longitudinally central area of the swirl tube and where the swirl tube has two axially adjacent swirl chambers of relative symmetrical arrangement. This type of construction eliminates the need for the respective end of the swirl tube, which not only reduces the wall friction but also combats the formation of turbulent flow in this area. The swirl tube apparatus of the present invention provides an advantage also in that the gas throughput is raised and the output of the device is doubled without appreciable added complexity of design.

When fed, the process gas flows into the separating area of the two swirl chambers and splits into two opposite symmetrical streams exhibiting a separating layer only in the wall area of the chamber.

The swirl chambers are given a conical shape in especially preferred practical embodiments of the invention, so that the reduction in diameter in the direction of flow increases the angular momentum over that of a cylindrical arrangement and that the reduction in gas velocity caused by wall friction is compensated at least in part.

The heavy fraction concentrating in the outer area of the swirl chamber is preferably extracted at the respective ends of the swirl chamber or swirl tube, while the lighter fraction is deflected in the center line area of the chambers and is there exhausted to ensure maximally defined separation of the two extraction points. In a further aspect of certain preferred embodiments of the present invention, deflector rings are provided which preferably continue into a convergent duct serving the concommitant function of extracting the light gas fraction, which prevents the two gas fractions from remixing.

For feeding the gas, several inlet ports are preferably provided which in the plane of symmetry are equally spaced over the circumference of the swirl tube.

The swirl tube apparatus of the present invention is suitable especially for forming cascades where in a further aspect of the present invention several swirl tubes are connected in line, with each pair of adjacent swirl tubes being fitted with at least one common extraction system. According to certain preferred embodiments of the invention, several such rows of swirl tubes are then arranged in parallel in compact disposition in a casing and are connected to common inlet and outlet ducts.

It has been shown that effective separation of the two gas components is achieved in swirl chambers of diameters in the order of several millimeters, because when these diameters are exceeded, the mixed gas will migrate into the eye of the swirl fast enough to prevent separation of the fractions. In connection with these sizing aspects, then, the swirl tubes of a row are advantageously integrated in a common component and combined in a block of, e.g., aluminum having bores to accommodate the rows of swirl tubes and collector ducts running at right angles thereto, according to yet further contemplated preferred embodiments of the invention.

The configuration of rows of swirl tubes in accordance with the present invention provides another advantage in that it can readily be fitted with a rotating whirl chamber wall with no appreciable added complexity of construction compared with individual swirl tubes. It will be useful, in certain preferred embodiments, to employ gas bearing provisions for the purpose where, e.g., two or more radial bearing cushions and two axial bearings, depending on the size of cascade, are pressurized with gas taken from the process gas.

A simplified design may also be used for the drive, which would, e.g., be a gasdynamic arrangement again pressurized with feed gas in practicing the present invention in connection with rotatable swirl chambers or tubes.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
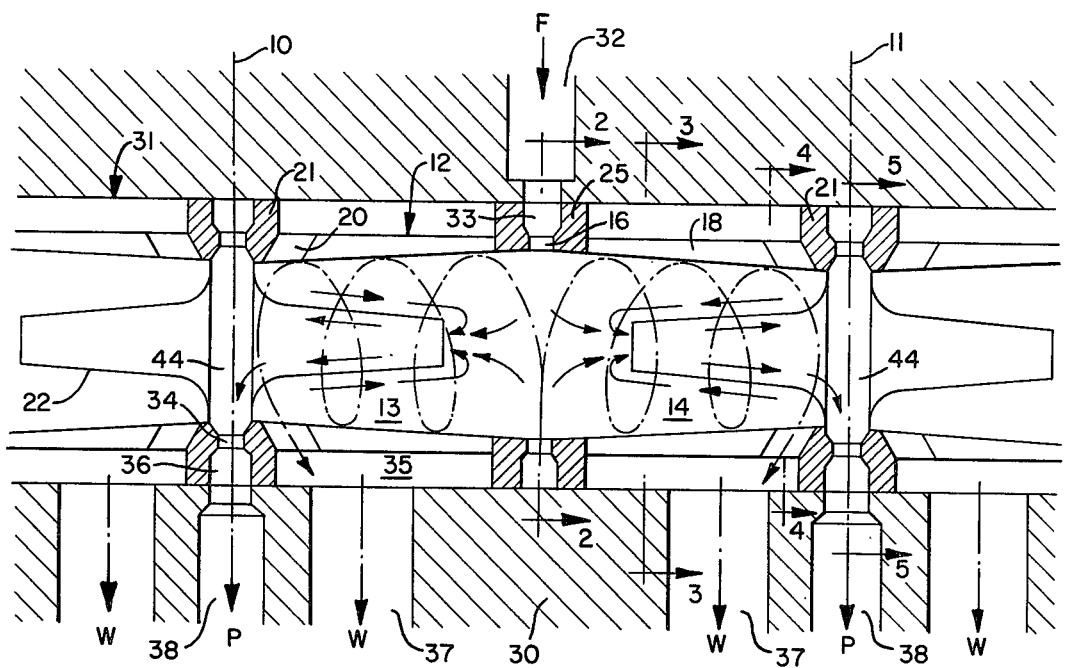
FIG. 1 is a partial schematic sectional view of swirl tube apparatus constructed in accordance with a preferred embodiment of the present invention.

In the drawings, similar reference characters are used to depict similar features throughout the various views. Unless otherwise indicated, the arrows in the drawings are intended to schematically depict direction of gas flow. In the drawings, the reference letter "F" indicates gas flow into swirl tube arrangement for separation, the reference letter "P" depicts a light gas fraction, and the reference letter "W" depicts a heavy gas fraction.

Figure 2:
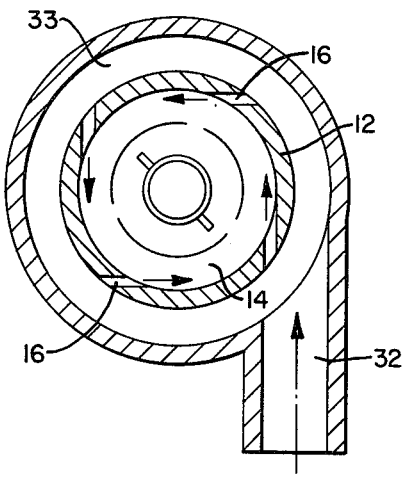
FIG. 2 is a sectional view taken along line 2—2 of FIG. 1.

FIG. 1 schematically depicts a portion of a swirl tube arrangement which includes a series of swirl tubes arranged adjacent one another in axial alignment, with a single tube disposed between lines 10 and 11 and with portions of similar tubes shown at respective opposite ends of this single tube. The swirl tube 12 takes the shape of a double cone and encloses two symmetrical swirl chambers 13 and 14. The process gas containing intermixed heavy and light gas fractions is fed via duct 32 and annular space 33, through tangential holes 16, which also extend through tube support inserts 25, into the double swirl chamber, where the stream of gas is split into two oppositely directed helical streams in which the gas components are separated by their weight. FIG. 2 shows a cross sectional detail view of the feed area (with the sectional view of FIG. 2 rotated for ease of illustration).

Figure 3:
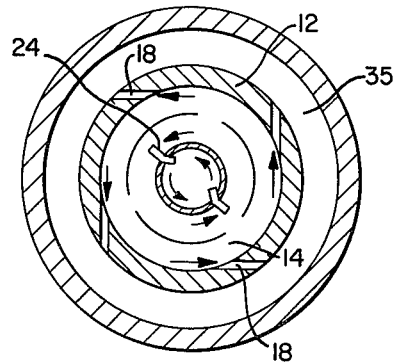
FIG. 3 is a sectional view taken along line 3—3 of FIG. 1.
Figure 4:
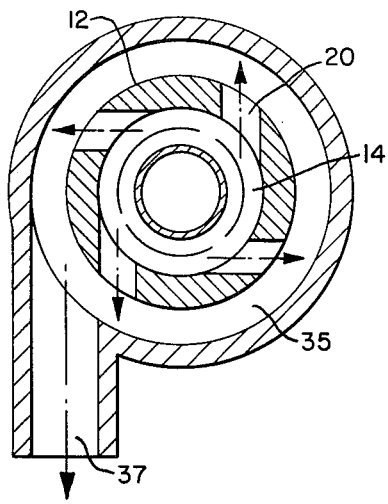
FIG. 4 is a sectional view taken along line 4—4 of FIG. 1.
Figure 5:
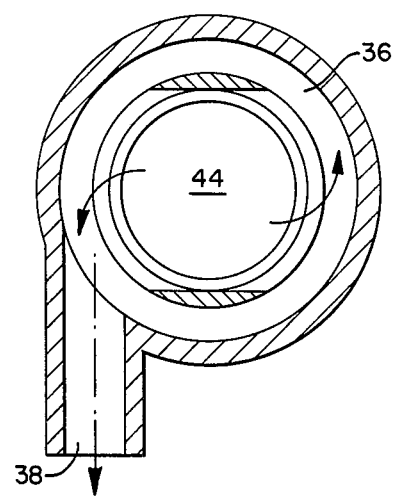
FIG. 5 is a sectional view taken along line 5—5 of FIG. 1.

The heavy gas fraction urged against the wall of the chamber by centrifugal force is partially exhausted through inclined slots 18, detailed in FIG. 3, already along the wall of the chamber to minimize the formation of a separation layer and the attendant friction losses. A further portion of the heavy gas fraction is exhausted at the respective ends of the swirl chambers 13 and 14 through inclined extraction ports 20. FIG. 4 is a cross-sectional view of these extraction ports which also schematically depict the heavy fraction exhaust duct 37.

The light component concentrating in the preponderantly inner area (near the longitudinal center line) is deflected at the ends by deflector rings 21 and guided in the process by the convergent outer wall of the extraction pipes 22. The extraction pipes 22 are preferably fitted with inclined slots 24 or similar provisions to exhaust the boundary layer (see FIG. 3).

Units of this configuration can be serially connected in any number or can be manufactured from a common tube according to various contemplated embodiments of the invention. FIG. 1 shows such a design and illustrates one end each of two adjacent swirl tubes of identical configuration. This row of swirl tubes is installed in a housing 30 fitted for the purpose with setting bores 31. The fresh gas enters, through hole or duct 32, an annulus 33 from where the gas is ducted, through the tangential ports 16, to the individual swirl tubes 12. The heavy gas fraction issuing from the slots 18 and the extraction holes 20 collects in an annulus 35 from where it is exhausted by way of holes or ducts 37.

The light gas fractions from two adjacent swirl chambers meet in a space 44 between the two swirl tubes, and are carried into an annulus 36 and are jointly exhausted from there via holes or ducts 38. The sectional detail views of FIG. 1 shown in FIGS. 2 to 5 represent cross-sections of the swirl tube in the gas inlet and outlet planes.

Figure 6:
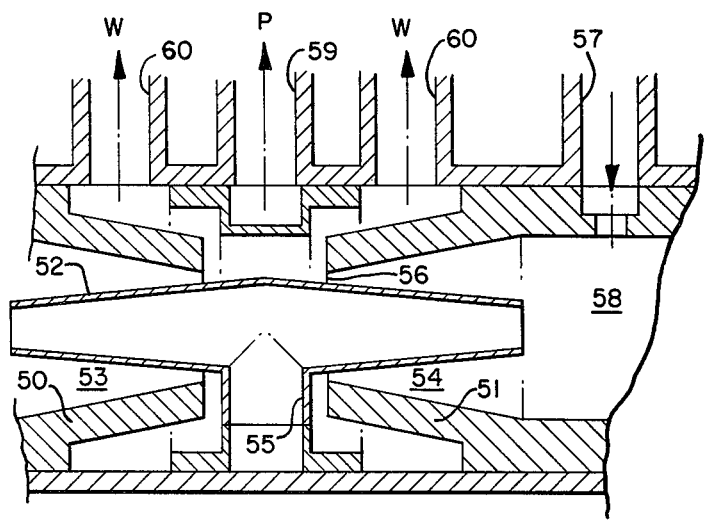
FIG. 6 is a partial schematic sectional view of swirl tube apparatus constructed in accordance with a second preferred embodiment of the present invention.

FIG. 6 shows a variant of the extraction system for a row of swirl tubes arranged generally as discussed above for the embodiment of FIGS. 1 to 5. The drawing shows the mouth areas of two adjacent swirl tubes 50 and 51. The place of the separate extraction pipes 22 shown in the preceding example is here taken by a common pipe 52 of double conical shape the ends of which extend into the adjacent swirl chambers 53 and 54. The gas collecting in this pipe is exhausted through a radial duct 55 which concurrently serves to retain the extraction pipe 52. In this case the deflector rings 21 are omitted. Their place is now taken by an annular extraction port 56 for the heavy gas fraction. The annular gap 56 is sized such that the heavy gas fraction is allowed passage through it but that the light component circulating in a preponderantly inner area is urged back by the pressure here developing to take a pattern similar to that of FIG. 1.

Via duct 57 the fresh gas flows into the double chamber 54, 58. The light gas fraction is extracted through the duct 59, and the heavy gas fraction through the ducts 60.

Figure 7:
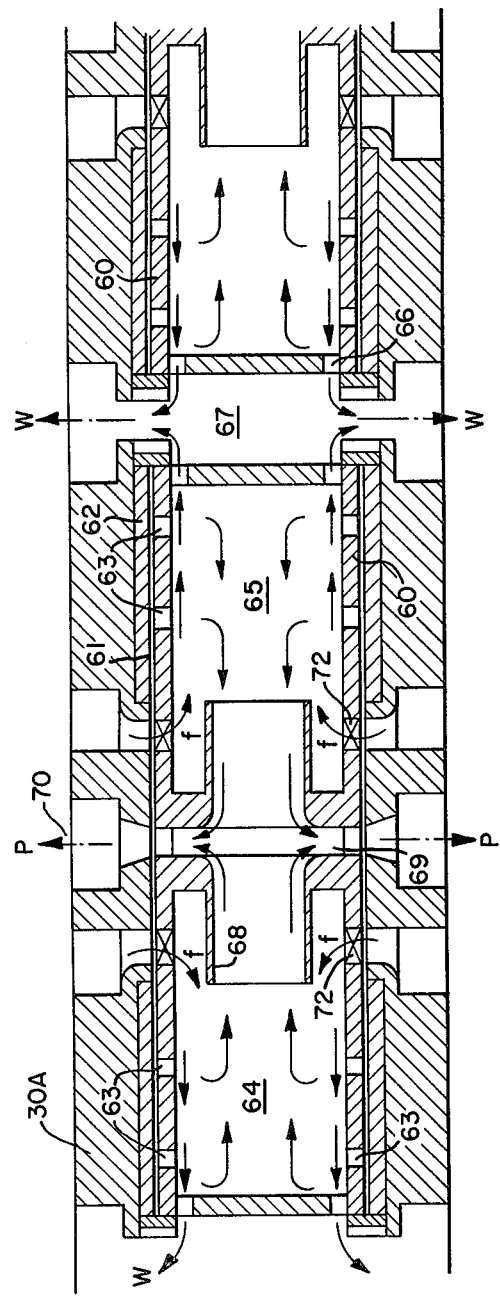
FIG. 7 is a partial schematic sectional view of swirl tube apparatus constructed in accordance with a third preferred embodiment of the present invention.

In the preferred embodiment of FIG. 7, a row of swirl tubes in housing 30A and having cylindrical, rotatably supported swirl tubes 60 is provided. The bearings provisions for the rotatable swirl tubes consists of an annularly cylindrical gas cushion 61 arranged at the circumference of the swirl tube between the tube and a sliding layer 62 of plastic or graphite and communicating with the swirl chambers 64 and 65 through ports 63.

Extraction of the heavy gas fraction W is achieved as in the preceding examples at the ends of the respective swirl tube via holes 66 which, however, issue into a space 67 arranged between two adjacent swirl tubes, from which space the heavy gas fraction is exhausted jointly. Shown also is a variant where the extraction of the light gas fraction P is achieved not at the ends but in the central area of the respective swirl tube through an extraction pipe similar to that shown in FIG. 6, except that it now takes a cylindrical shape and is not arranged between two adjacent swirl tubes. The inlet ports 72 are spaced at an equal distance from the plane of symmetry 70 of the swirl tube 60.

The feed provisions for the fresh gas concurrently serve to drive the swirl tube 60. For this purpose, the swirl tube 60 is provided with vanes or drive surfaces omitted on the drawings. However, the separate swirl tubes shown on the drawing can also be manufactured as a single component, which concentrates the drive and bearing provisions on a few remaining points and eliminates the need for providing them separately for all tubes.

Figure 8:
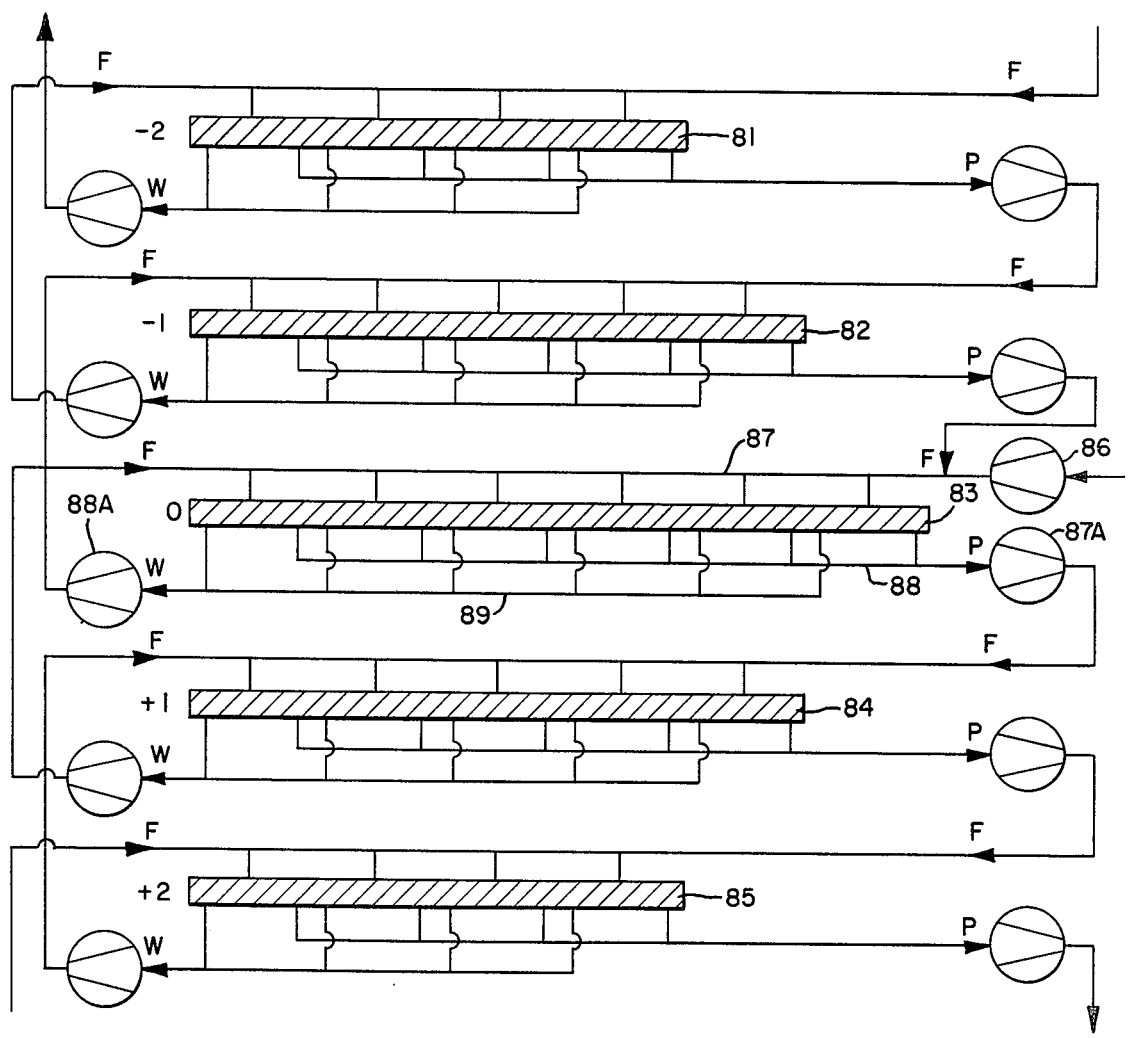
FIG. 8 is a schematic diagram showing a series of cascaded swirl tube arrangements for sequentially purifying the separated gas mixtures, constructed in accordance with a further preferred embodiment of the present invention.

FIG. 8 schematically depicts a simplified arrangement of several rows of swirl tubes 81 to 85 connected together in a cascade. A first compressor 86 is used to introduce fresh gas under pressure into the manifold 87 of stage O, which gas is being routed to the individual swirl chambers in row 83. The light gas fraction P collecting in the manifold 88 is exhausted and forwarded, through a second compressor 87A, to stage 1 (row 84), while the heavy gas fraction W from the manifold 89 is carried to stage −1 (row 82) through a third compressor 88A. Stage O further receives corresponding gas fractions from the two adjacent rows of swirl tubes 82 and 84. The final extraction of the two gas fractions is achieved via the two outermost stages, viewed from the central stage O (81 is the row for final extraction of the heavy gas fraction W and 85 is the row for final extraction of the light gas fraction P). In each case, as the light gas fraction goes to the next stage of extraction refinement, the heavy gas fraction separately is returned to the preceding stage. In like manner, as the heavy gas fraction goes to the next stage of extraction refinement, the light gas fraction separated is returned to the preceding stage.

Figure 9:
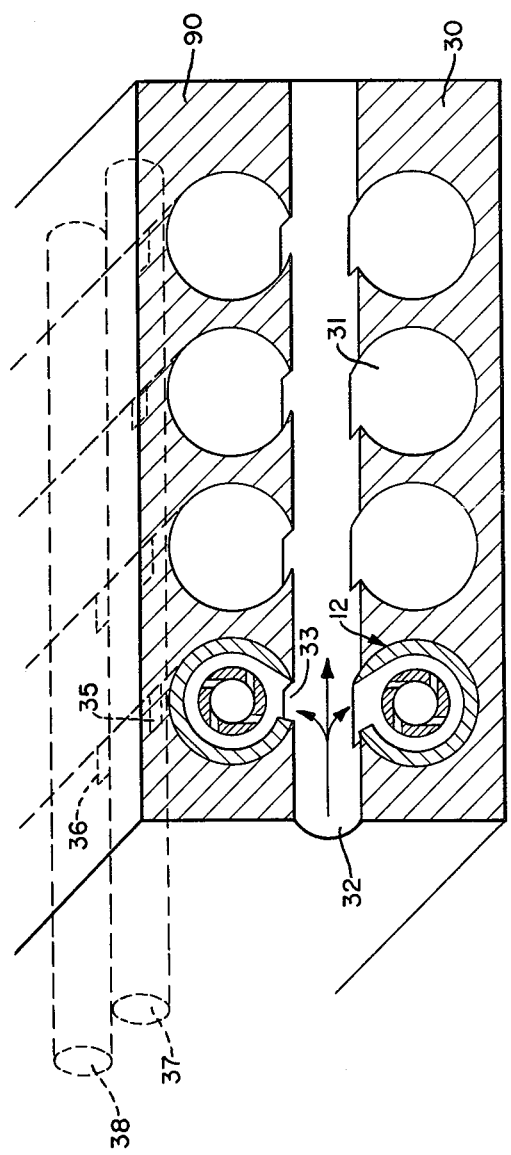
FIG. 9 is an enlarged schematic detail view showing a construction according to the present invention for use in a cascade system such as shown in FIG. 8.

FIG. 9 schematically illustrates a cascade block consisting of block housing 90 (of housing 30, 30A as discussed with respect to the specific swirl tube construction above) and swirl tubes 12 arranged therein. The rows of swirl tubes are inserted into existing seating bores 31 of the block 90. For delivering and withdrawing the process gas, manifolds 32, 37 and 38 (compare FIG. 1) are provided in the block at right angles to the seating bores such that they intersect the seating bores 31, forming inclined inlet and outlet ports 33, 35 and 36. Cascade blocks of this description can be combined in the form of building blocks to form a compact system.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Swirl tube or chamber apparatus for separating an isotope or gas mixture of a process gas having heavy and light gas fractions, comprising,
   a housing,
   a plurality of swirl chambers disposed in said housing in an axially aligned relationship with an end of adjacent swirl chambers facing one another;
   feed port means extending through said housing and comprising a plurality of ports tangentially issuing into the swirl chambers for feeding said process gas mixture thereto;
   first extraction port means for extracting a heavy gas fraction from at least one end of said swirl chambers; and
   second extraction port means for extracting a light gas fraction comprising common extraction means for extracting said light gas fraction from said facing ends of adjacent swirl chambers, said common extraction means including extraction pipes projecting axially into said swirl chambers and being radially inwardly of said first extraction port means,
   wherein said first and second extraction port means directly communicate with respective collection ducts formed in said housing for the withdrawal of the respective fractions extracted thereby.

2. Apparatus according to claim 1, wherein the projecting extraction pipes have means for exhausting a boundary layer of said light gas fraction.

3. Swirl tube according to claim 1, wherein said first extraction port means is located in said facing ends of the swirl chambers and said swirl chambers converge in a direction of flow from said feed port means to said first extraction port means.

4. Swirl tube according to claim 1 or 3, wherein said extraction pipes are formed as parts of a common extraction pipe.

5. Swirl tube according to claim 1, wherein said swirl chambers are mounted for rotation and said first extraction port means are positioned adjacent a radially outer boundary of said swirl chambers.

* * * * *